US010857976B2

(12) United States Patent
Kusumoto et al.

(10) Patent No.: US 10,857,976 B2
(45) Date of Patent: Dec. 8, 2020

(54) MOBILE DEVICE POSITION ESTIMATION SYSTEM

(71) Applicant: DENSO CORPORATION, Kariya (JP)

(72) Inventors: Tetsuya Kusumoto, Nisshin (JP); Koji Sakamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/412,966

(22) Filed: May 15, 2019

(65) Prior Publication Data

US 2019/0263358 A1 Aug. 29, 2019

Related U.S. Application Data

(63) Continuation of application No. PCT/JP2017/036569, filed on Oct. 10, 2017.

(30) Foreign Application Priority Data

Dec. 5, 2016 (JP) ................................. 2016-236158

(51) Int. Cl.
| | | |
|---|---|---|
| *B60R 25/24* | (2013.01) | |
| *H04W 4/44* | (2018.01) | |
| *H04W 4/80* | (2018.01) | |
| *G01S 1/26* | (2006.01) | |
| *H04W 64/00* | (2009.01) | |
| *E05B 49/00* | (2006.01) | |
| *G01S 13/46* | (2006.01) | |

(52) U.S. Cl.
CPC ............ *B60R 25/245* (2013.01); *B60R 25/24* (2013.01); *B60R 25/246* (2013.01); *E05B 49/00* (2013.01); *G01S 1/26* (2013.01); *G01S 13/46* (2013.01); *H04W 4/44* (2018.02); *H04W 4/80* (2018.02); *H04W 64/00* (2013.01)

(58) Field of Classification Search
CPC ........ B60R 25/245; H04W 4/44; G01S 13/46; G01S 1/26
USPC .......................................................... 340/5.7
See application file for complete search history.

(56) References Cited

U.S. PATENT DOCUMENTS

| | | | |
|---|---|---|---|
| 2012/0014412 A1 | 1/2012 | Nakagawa et al. | |
| 2014/0330449 A1 | 11/2014 | Oman et al. | |
| 2018/0143648 A1* | 5/2018 | Kim ..................... | G05D 1/0274 |

FOREIGN PATENT DOCUMENTS

| | | | | |
|---|---|---|---|---|
| JP | 02000244967 | * | 9/2000 | ............... H04Q 7/34 |
| JP | 2014227647 A | | 12/2014 | |
| WO | WO-2010106747 A1 | | 9/2010 | |

* cited by examiner

*Primary Examiner* — Vernal U Brown
(74) *Attorney, Agent, or Firm* — Harness, Dickey & Pierce, P.L.C.

(57) ABSTRACT

A mobile device position estimation system includes: a vehicular system having a vehicle side transmitter transmitting an impulse signal, a vehicle side receiver receiving a response signal, and a vehicle side control unit outputting a transmission command signal of the impulse signal and receiving a notification signal of the response signal; and a mobile device having a mobile device side receiver receiving the impulse signal and a mobile device side transmitter transmitting the response signal. The vehicle side control unit includes: a reception detection unit detecting the response signal; a round-trip timer measuring a round-trip time; and a position estimation unit estimating a position of the mobile device. The position estimation unit: calculates a round-trip distance; and determines whether the mobile device is within a detection area.

6 Claims, 6 Drawing Sheets

MOBILE DEVICE POSITION ESTIMATION SYSTEM

CROSS REFERENCE TO RELATED APPLICATIONS

The present application is a continuation application of International Patent Application No. PCT/JP2017/036569 filed on Oct. 10, 2017, which designated the United States and claims the benefit of priority from Japanese Patent Application No. 2016-236158 filed on Dec. 5, 2016. The entire disclosures of all of the above applications are incorporated herein by reference.

TECHNICAL FIELD

The present disclosure relates to a mobile device position estimation system for detecting that a mobile device is present around a vehicle.

BACKGROUND

There have conventionally been proposed various mobile device position estimation systems in which a vehicular system mounted on a vehicle performs transmission and reception of a radio signal with a mobile device carried by a user to detect that the mobile device is present around the vehicle.

SUMMARY

A mobile device position estimation system may include: a vehicular system having a vehicle side transmitter transmitting an impulse signal, a vehicle side receiver receiving a response signal, and a vehicle side control unit outputting a transmission command signal of the impulse signal and receiving a notification signal of the response signal; and a mobile device having a mobile device side receiver receiving the impulse signal and a mobile device side transmitter transmitting the response signal. The vehicle side control unit may include: a reception detection unit detecting the response signal; a round-trip timer measuring a round-trip time; and a position estimation unit estimating a position of the mobile device. The position estimation unit may: calculate a round-trip distance; and determine whether the mobile device is within a detection area.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
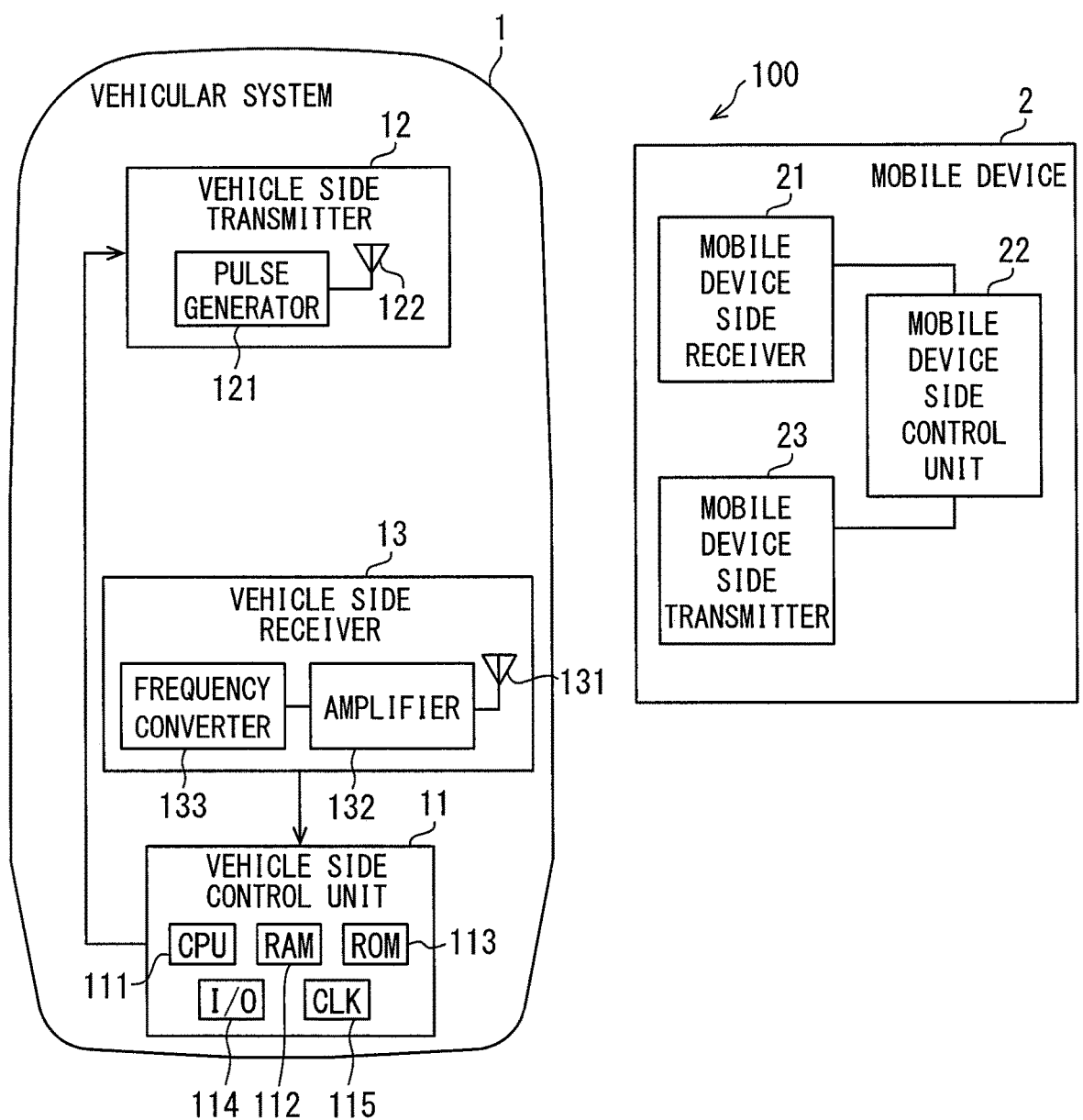
FIG. 1 is a block diagram illustrating a schematic configuration of a mobile device position estimation system.

For example, a configuration is provided such that a vehicular system and a mobile device are capable of performing ultra wide band (UWB) communication with each other, and the vehicular system estimates the distance of the mobile device with respect to the vehicle on the basis of the time from transmission of an impulse signal used in the UWB communication to reception of a response signal from the mobile device (hereinbelow, the round-trip time).

Further, as a configuration of the vehicular system, a configuration is provided such that one transmitter and one receiver for an impulse signal in the UWB band are disposed in each of the vicinity of the driver's seat and the vicinity of the passenger seat (that is, two sets in total are disposed) to cover an operation area of a vehicle electronic key system. The vehicle electronic key system described herein is a system in which the vehicular system and the mobile device perform an authentication process by wireless communication, and the vehicular system executes vehicle control such as locking and unlocking of a vehicle door on the basis of the success of the authentication process.

Typically, each of a transmitter for an impulse signal and a receiver for an impulse signal has a non-directional property. Thus, a transceiver including a transmitter and a receiver as a set forms a detection area having a circular shape. Thus, in order to form a detection area having an elliptical shape, a plurality of transceivers are required. It is needless to say that the manufacturing cost increases as the number of transmitters and receivers increases.

Thus, a mobile device position estimation system capable of forming a detection area having an elliptical shape at a lower cost is provided.

According to an aspect of the example embodiment, a mobile device position estimation system includes: a vehicular system mounted on a vehicle; and a mobile device carried by a user of the vehicle. The vehicular system includes: a vehicle side transmitter that transmits an impulse signal which is a pulse-like signal having an ultra wide bandwidth when a predetermined transmission command signal is input; a vehicle side receiver that receives the impulse signal and, when the vehicle side receiver receives the impulse signal, outputs a notification signal indicative of a reception of the impulse signal; and a vehicle side control unit that is connected to each of the vehicle side transmitter and the vehicle side receiver, and outputs the transmission command signal to the vehicle side transmitter and receives the notification signal output from the vehicle side receiver. The mobile device includes: a mobile device side receiver that receives the impulse signal; and a mobile device side transmitter that, when the mobile device side receiver receives the impulse signal, transmits the impulse signal as a response signal to a received impulse signal. The vehicle side control unit includes: a reception detection unit that detects that the impulse signal as the response signal transmitted from the mobile device is received, based on an input of the notification signal; a round-trip timer that measures, as a round-trip time, a time from when the transmission command signal is output to when the reception detection unit detects a reception of the impulse signal as the response signal; and a position estimation unit that estimates a position of the mobile device with respect to the vehicle based on the round-trip time measured by the round-trip timer. The vehicle side receiver is disposed at a position spaced away from the vehicle side transmitter by a predetermined distance in a vehicle front-rear direction or a vehicle width direction. The position estimation unit: calculates a round-trip distance that is a sum of a distance from the vehicle side transmitter to the mobile device and a distance from the mobile device to the vehicle side receiver, based on the round-trip time; and determines whether the mobile device is present within a detection area having an elliptical shape, which has focuses at installation positions of the vehicle side transmitter and the vehicle side receiver, respectively, based on the round-trip distance.

In the above configuration, the vehicle side transmitter and the vehicle side receiver are disposed away from each other by a predetermined distance. In such a configuration, the locus of a point where the round-trip distance, which is the sum of the distance from the vehicle side transmitter to the mobile device and the distance from the mobile device to the vehicle side receiver, is constant forms an elliptical shape having focuses at the respective installation positions of the vehicle side transmitter and the vehicle side receiver.

Thus, it is possible to form a detection area having an elliptical shape by defining an area having a round-trip distance within a predetermined distance as the detection area. Further, according to the above configuration, one transmitter and one receiver are enough to form the detection area having an elliptical shape. Thus, according to the above configuration, it is possible to form a detection area having an elliptical shape at a lower cost.

<Schematic Configuration of Mobile Device Position Estimation System 100>

Hereinbelow, an embodiment of the present disclosure will be described with reference to the drawings. FIG. 1 is a diagram illustrating an example of a schematic configuration of a mobile device position estimation system 100 according to the present disclosure. As illustrated in FIG. 1, the mobile device position estimation system 100 is provided with a vehicular system 1 which is mounted on a vehicle and a mobile device 2 which is a communication terminal carried by a user of the vehicle.

The vehicular system 1 and the mobile device 2 are capable of transmitting and receiving an impulse-like radio wave (hereinbelow, the impulse signal) which is used in ultra wide band (UWB) communication. The impulse signal used in the UWB communication has a pulse width of an extremely short time (e.g., 2 ns) and has a bandwidth of 500 MHz or more (that is, an ultra wide bandwidth).

Examples of a frequency band that can be used in the UWB communication (hereinbelow, the UWB band) include 3.1 GHz to 10.6 GHz, 3.4 GHz to 4.8 GHz, 7.25 GHz to 10.6 GHz, and 22 GHz to 29 GHz. Among these various frequency bands, the UWB band in the present embodiment indicates the band of 3.1 GHz to 10.6 GHz as an example. That is, the impulse signal in the present embodiment is implemented using a radio wave in the band of 3.1 GHz to 10.6 GHz. It is only required that the bandwidth of the impulse signal be 500 MHz or more, and the impulse signal may have a bandwidth of 1.5 GHz or more.

When the mobile device 2 in the present embodiment receives the impulse signal, the mobile device 2 returns the impulse signal as a response signal. The vehicular system 1 estimates the position of the mobile device with respect to the vehicle on the basis of the time from transmission of the impulse signal to return of the impulse signal from the mobile device 2 (hereinbelow, the round-trip time). Hereinbelow, specific configurations of the vehicular system 1 and the mobile device 2 will be described in order.

<Configuration of Mobile Device 2>

First, the configuration and the operation of the mobile device 2 will be described. The mobile device 2 can be implemented using a communication terminal which is applied to various purposes. Here, as an example, a mobile device that is used in a vehicle electronic key system and installed with the following configuration functions as the mobile device 2 in the present embodiment.

The vehicle electronic key system executes vehicle control such as locking and unlocking of a vehicle door by wireless communication performed between a vehicular device mounted on a vehicle and a mobile device carried by a user of the vehicle. The vehicle electronic key system includes a known keyless entry system. Further, the vehicle electronic key system also includes a system (so-called smart entry system) in which a vehicular device and a mobile device perform an authentication process by wireless communication, and the vehicular device executes predetermined vehicle control on the basis of the success of the authentication process.

As illustrated in FIG. 1, the mobile device 2 is provided with a mobile device side receiver 21, a mobile device side control unit 22, and a mobile device side transmitter 23. The mobile device side control unit 22 is communicably connected to each of the mobile device side receiver 21 and the mobile device side transmitter 23.

The mobile device side receiver 21 is a configuration for receiving an impulse signal in the UWB band. The mobile device side receiver 21 receives an impulse signal transmitted by the vehicular system 1 through an antenna (not illustrated), performs a predetermined process such as shaping, amplification, or frequency conversion on the impulse signal, and outputs the impulse signal to the mobile device side control unit 22.

When the mobile device side receiver 21 receives an impulse signal, the mobile device side control unit 22 outputs a signal commanding transmission of an impulse signal to the mobile device side transmitter 23. The mobile device side control unit 22 may be implemented using a computer provided with a CPU, a RAM, and a ROM. The mobile device side control unit 22 may be implemented using one or more ICs.

The mobile device side transmitter 23 is provided with an antenna for transmitting an impulse signal, and transmits an impulse signal in accordance with the command from the mobile device side control unit 22. A predetermined time (hereinbelow, the response processing time) is required from when the mobile device 2 receives the impulse signal to when the mobile device 2 transmits the impulse signal as the response signal. The response processing time is determined in accordance with the hardware configuration of the mobile device 2. Thus, an estimated value of the response processing time can be previously specified by, for example, a test.

<Configuration of Vehicular System 1>

Next, the configuration of the vehicular system 1 will be described. As illustrated in FIG. 1, the vehicular system 1 is provided with a vehicle side control unit 11, a vehicle side transmitter 12, and a vehicle side receiver 13. The vehicle side control unit 11 is a configuration that controls the operation of the entire vehicular system 1 and communicably connected to each of the vehicle side transmitter 12 and the vehicle side receiver 13.

The vehicle side control unit 11 is configured as a computer. That is, the vehicle side control unit 11 is provided with a CPU 111 as a central processing unit, a RAM 112 which is a volatile storage medium, a ROM 113 which is a nonvolatile storage medium, an I/O 114 as a signal input/output interface, and a clock oscillator 115 which sequentially outputs clock signals.

The clock oscillator 115 only has to have a desired operation frequency and a desired accuracy. For example, a crystal oscillator or a rubidium oscillator can be used as the clock oscillator 115. A program for causing an ordinary computer to function as the vehicle side control unit 11 in the present embodiment (hereinbelow, the position estimation program) is stored in the ROM 113. The position estimation program may be stored in a non-transitory tangible storage medium. Executing the position estimation program by the CPU 111 corresponds to executing a method corresponding to the position estimation program. Further, various calculation parameters are stored in the ROM 113. The ROM 113 corresponds to a storage unit.

A detailed function of the vehicle side control unit 11 will be described later, but is schematically as follows. The vehicle side control unit 11 outputs a signal (hereinbelow, the trigger signal) commanding transmission of an impulse signal to the vehicle side transmitter 12 at a predetermined timing to cause the vehicle side transmitter 12 to transmit the impulse signal. The trigger signal corresponds to a transmission command signal. Then, the vehicle side control unit 11 estimates the positional relationship between the vehicle and the mobile device 2 on the basis of the time from when the vehicle side control unit 11 outputs the trigger signal to the vehicle side transmitter 12 to when the vehicle side receiver 13 receives the impulse signal (that is, the round-trip time).

A distance of propagation of the impulse signal through a space increases as the mobile device 2 is farther from the vehicle. Thus, the round-trip time also increases. That is, the round-trip time functions as an index of the distance between the vehicle and the mobile device 2.

The vehicle side transmitter 12 is a configuration that transmits an impulse signal in accordance with a command from the vehicle side control unit 11. The vehicle side transmitter 12 is provided with, as more detailed elements, a pulse generator 121 and a transmission antenna 122 for radiating an impulse signal. When the trigger signal is input, the pulse generator 121 generates an electric impulse signal and outputs the generated electric impulse signal to the transmission antenna 122. The transmission antenna 122 converts the electric impulse signal input from the pulse generator 121 to a radio wave and radiates the radio wave. That is, the transmission antenna 122 radiates a pulse-like radio wave having a predetermined bandwidth in the UWB band as an impulse signal.

A rise time Tr of an impulse signal in the UWB band is typically approximately one nanosecond. Also in the present embodiment, the vehicle side transmitter 12 is configured in such a manner that the rise time Tr of an impulse signal is one nanosecond. The rise time Tr is the time required for a signal intensity to exceed 90% of the maximum amplitude after the signal intensity exceeds 10% of the maximum amplitude for the first time. The rise time Tr of an impulse signal is determined in accordance with the hardware configuration such as the circuit configuration of the vehicle side transmitter 12. The rise time Tr of an impulse signal can be specified by a simulation or a real test.

The vehicle side receiver 13 is a configuration for receiving an impulse signal. The vehicle side receiver 13 is provided with, as more detailed elements, a reception antenna 131, an amplifier 132, and a frequency converter 133. The reception antenna 131 is an antenna for receiving an impulse signal in the UWB band. The reception antenna 131 outputs an electric signal corresponding to a received signal to the amplifier 132. The amplifier 132 amplifies a signal (e.g., an impulse signal) received by the reception antenna 131 and outputs the amplified signal to the frequency converter 133.

The frequency converter 133 converts the frequency of the signal input from the amplifier 132 to a frequency that can be processed by the vehicle side control unit 11 (so-called base band) and outputs the signal having the converted frequency. For example, when the reception antenna 131 receives an impulse signal in the UWB band, the frequency converter 133 outputs an electric impulse signal (hereinbelow, the received pulse signal) in a frequency that can be processed by the vehicle side control unit 11 to the vehicle side control unit 11. The received pulse signal corresponds to a signal notifying the vehicle side control unit 11 that the vehicle side receiver 13 has received the impulse signal (that is, a notification signal).

<Installation Positions of Vehicle Side Transmitter 12 and Vehicle Side Receiver 13>

Figure 2:
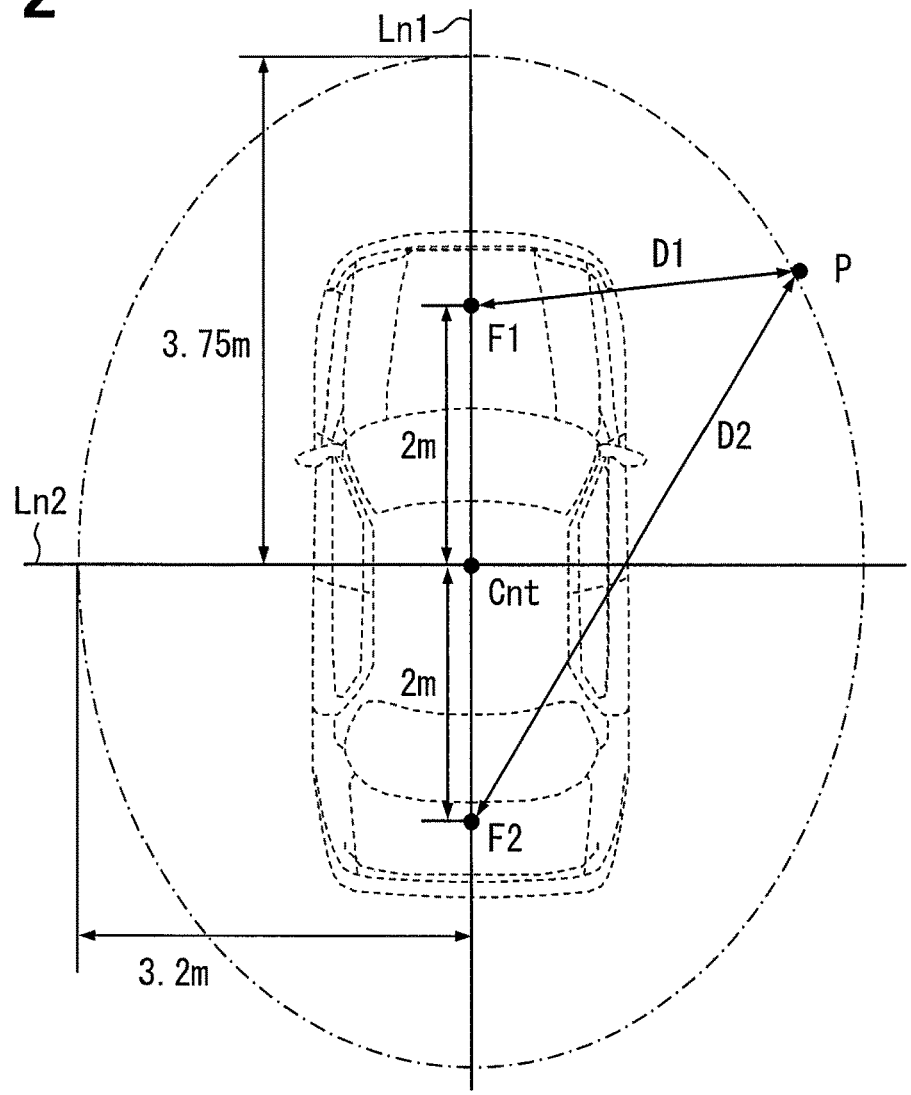
FIG. 2 is a diagram for describing the relationship between installation positions of a vehicle side transmitter and a vehicle side receiver and a detection area.

Here, installation positions of the vehicle side transmitter 12 and the vehicle side receiver 13 will be described with reference to FIG. 2. FIG. 2 is a top view (so-called bird's eye view) of the vehicle. For convenience, the outline shape of a vehicle body itself is indicated by a broken line in FIG. 2. Here, as an example, the vehicle equipped with the vehicular system 1 has a length of 4.5 m from the front end to the rear end and a length of 2 m in the vehicle width direction.

A point Cnt of FIG. 2 indicates the center of the vehicle. The center of the vehicle is an intermediate point of a line segment connecting the central part in the vehicle width direction of a vehicle front end part and the central part in the vehicle width direction of a vehicle rear end part. A straight line Ln1 indicates a straight line that is parallel to the vehicle front-rear direction and passes through the center of the vehicle (hereinbelow, the vehicle center line). The vehicle center line is a straight line that overlaps the line segment connecting the central part in the vehicle width direction of the vehicle front end part and the central part in the vehicle width direction of the vehicle rear end part. A straight line Ln2 in FIG. 2 indicates a straight line that is parallel to the vehicle width direction and passes through the center of the vehicle (hereinbelow, the vehicle width direction line).

In the present embodiment, as an example, the vehicle side transmitter 12 is disposed at a position 2 m away from the center Cnt toward the vehicle front end on the vehicle center line Ln1. Further, the vehicle side receiver 13 is disposed at a position 2 m away from the center Cnt toward the vehicle rear end on the vehicle center line Ln1. That is, the vehicle side transmitter 12 and the vehicle side receiver 13 are disposed 4 m away from each other in the vehicle front-rear direction. In FIG. 2, F1 indicates the installation position of the vehicle side transmitter 12, and F2 indicates the installation position of the vehicle side receiver 13.

When the vehicle side transmitter 12 and the vehicle side receiver 13 are disposed away from each other in the vehicle front-rear direction on the vehicle center line, the locus of a point P where the sum (hereinbelow, the round-trip distance)

of a distance D1 from the vehicle side transmitter 12 to the mobile device 2 (hereinbelow, the outward distance D1) and a distance D2 from the mobile device 2 to the vehicle side receiver 13 (hereinbelow, the return distance D2) is constant forms an elliptical shape having focuses at F1 and F2. The round-trip distance is estimated from the round-trip time by a method described below.

In FIG. 2, the locus of the point P having a round-trip distance of 7.5 m is indicated by a dot-dash line. Specifically, the locus of the point P having a round-trip distance of 7.5 m forms an elliptical shape having a semimajor axis of 3.75 m and a semiminor axis of 3.2 m. An area located inside the dot-dash line corresponds to an area having a round-trip distance of 7.5 m or less. That is, the dot-dash line corresponds to a boundary line of the area having a round-trip distance within 7.5 m.

In such a configuration, a detection area can be set to an elliptical shape by defining an area having a round-trip distance within a predetermined distance as the detection area. That is, the detection area can be set to an elliptical shape elongated in the vehicle front-rear direction by disposing the vehicle side transmitter 12 and the vehicle side receiver 13 away from each other in the vehicle front-rear direction on the vehicle center line and defining the detection area by the round-trip distance. The detection area described herein corresponds to an area where the mobile device 2 is determined to be present around the vehicle by the vehicular system 1. Hereinbelow, the round-trip distance which defines the size of the detection area is referred to as the area forming distance.

Although the present embodiment employs, as an example, the configuration in which the vehicle side transmitter 12 is disposed closer to the vehicle front end than the vehicle side receiver 13 is, the present disclosure is not limited thereto. The position of the vehicle side transmitter 12 and the position of the vehicle side receiver 13 may be exchanged. That is, the vehicle side receiver 13 may be disposed closer to the vehicle front end than the vehicle side transmitter 12 is.

Further, although the present embodiment employs, as an example, the configuration in which the vehicle side transmitter 12 and the vehicle side receiver 13 are disposed on the vehicle center line Ln1, the present disclosure is not limited thereto. The vehicle side transmitter 12 and the vehicle side receiver 13 may be disposed side by side with a predetermined distance therebetween in the vehicle front-rear direction at positions shifted from the vehicle center line Ln1.

<Functions of Vehicle Side Control Unit 11>

Figure 3:
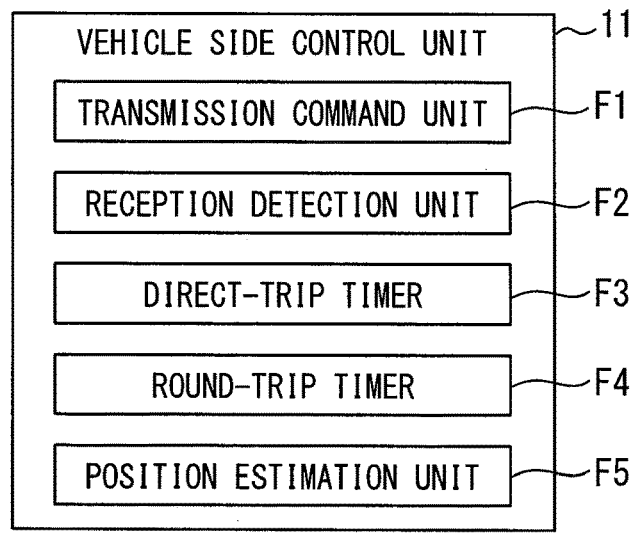
FIG. 3 is a block diagram illustrating the configuration of a vehicle side control unit.

As illustrated in FIG. 3, the vehicle side control unit 11 is provided with a transmission command unit F1, a reception detection unit F2, a direct-trip timer F3, a round-trip timer F4, and a position estimation unit F5 as functions implemented by executing the position estimation program stored in the ROM 113 by the CPU 111. Some or all of the various functional blocks included in the vehicle side control unit 11 may be implemented as hardware using one or more ICs. Further, some or all of the various functional blocks may be implemented by the combination of execution of software by the CPU 111 and a hardware member.

The transmission command unit F1 outputs a trigger signal to the vehicle side transmitter 12 at a predetermined timing. In the present embodiment, as an example, the transmission command unit F1 periodically outputs the trigger signal at a predetermined period (hereinbelow, the search period). A specific value of the search period may be appropriately set, and may, for example, be 100 milliseconds. Of course, the search period may also be 50 milliseconds or 200 milliseconds. The possibility of detecting an approach of the mobile device 2 to the vehicle at an early stage can be increased by relatively shortening the search period. Further, a transmission frequency of an impulse signal can be reduced by relatively extending the search period. Thus, power consumption can be reduced.

The reception detection unit F2 detects that the vehicle side receiver 13 has directly received an impulse signal transmitted by the vehicle side transmitter 12 or the vehicle side receiver 13 has received an impulse signal returned from the mobile device 2 on the basis of a received pulse signal input from the vehicle side receiver 13. Detecting the reception of a predetermined signal corresponds to determining that the signal has been received. Hereinbelow, for convenience, the impulse signal that is transmitted from the vehicle side transmitter 12 and directly arrives at the vehicle side receiver 13 is referred to as a direct wave, and the impulse signal that is returned from the mobile device 2 is referred to as a response wave.

Figure 4:
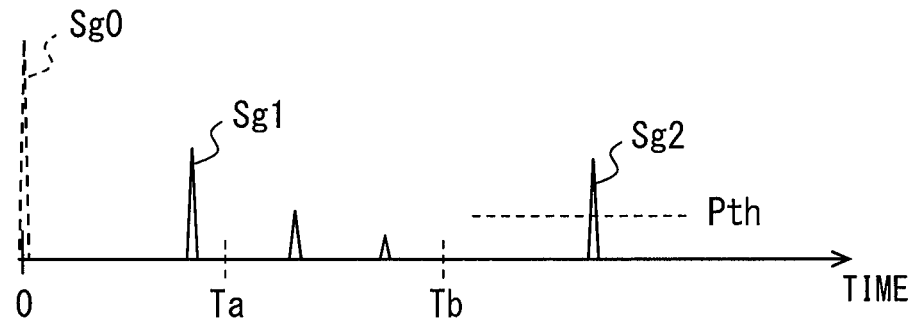
FIG. 4 is a diagram for describing the operation of a reception detection unit.

The operation of the reception detection unit F2 will be described with reference to FIG. 4. The horizontal axis in FIG. 4 represents an elapsed time from the output of the trigger signal. An impulse signal Sg0 indicated by a broken line conceptually represents an impulse signal output by the vehicle side transmitter 12. The reception detection unit F2 determines that a received pulse signal Sg1 which is input first after the output of the trigger signal is a received pulse signal corresponding to the direct wave. That is, when the pulse signal Sg1 is input first after the output of the trigger signal, it is determined that the direct wave has been received.

However, the reception detection unit F2 does not perform a detection process for detecting that an impulse signal based on a received pulse signal has been received in a reflected wave arrival time period which is defined with a time point when the trigger signal is transmitted as a starting time point. That is, a received pulse signal input in the reflected wave arrival time period is treated as not being input.

The reflected wave arrival time period used herein is a time period during which an impulse wave transmitted by the vehicle side transmitter 12 arrives after being reflected by a structure present outside and inside a cabin. Specific values of a time Ta which defines a start time of the reflected wave arrival time period (hereinbelow, the observation stop time) and a time Tb which defines a finish time of the reflected wave arrival time period (hereinbelow, the observation restart time) may be appropriately set by, for example, a test.

When the above reflected wave arrival time period is set, for example, a received pulse signal that is input after an elapse of the observation stop time Ta or more from the output of the trigger signal is not determined to be the received pulse signal corresponding to the direct wave. Accordingly, it is possible to reduce the possibility that reception of the reflected wave is erroneously determined to be reception of the direct wave. In other words, the observation stop time Ta corresponds to a maximum value of the time during which the direct wave can be received.

The observation stop time Ta may be a value obtained by adding a predetermined internal processing time which is defined in accordance with the hardware configuration of the vehicular system 1 and a predetermined tolerance to a value obtained by dividing the distance between the vehicle side transmitter 12 and the vehicle side receiver 13 by a propagation velocity C of a radio wave. The propagation velocity C of a radio wave in the air is $3 \times 10^8$ [m/s].

The internal processing time is the sum of a trigger transmission time, a transmission processing time, a reception processing time, and a received signal transmission time. The trigger transmission time is the time required for the trigger signal to be transmitted from the vehicle side control unit 11 to the vehicle side transmitter 12. The transmission processing time is the time required for internal processing in the vehicle side transmitter 12. The transmission processing time includes the rise time Tr of the impulse. The reception processing time is the time required for internal processing in the vehicle side receiver 13. The received signal transmission time is the time required for the received pulse signal to be transmitted from the vehicle side receiver 13 to the vehicle side control unit 11.

Further, the reception detection unit F2 determines that the response wave has been received when a received pulse signal Sg2 having an amplitude of a predetermined threshold Pth or more is input after the time point when the observation restart time Tb or more elapses from the output of the trigger signal. The threshold Pth may be any value included in the range of 10% to 90% of the estimated maximum amplitude of the received pulse signal. Detailed conditions employed as the reception time may be appropriately set. For example, the timing when the intensity of the received pulse signal exceeds the threshold Pth may be employed as the reception time point of the impulse signal. Further, the timing when the intensity of the received pulse signal reaches a peak may be employed as the reception time point of the impulse signal.

The observation restart time Tb may be determined in accordance with the time when the start of reception of the response wave is estimated. For example, the observation restart time Tb may be a value obtained by adding an estimated value of the response processing time in the mobile device 2 to the internal processing time.

When the reception detection unit F2 detects the reception of the direct wave, the reception detection unit F2 notifies the direct-trip timer F3 of the reception of the direct wave. Further, when the reception detection unit F2 detects the reception of the response wave, the reception detection unit F2 notifies the round-trip timer F4 of the reception of the response wave. The vehicle side receiver 13 may have the function of the reception detection unit F2.

The direct-trip timer F3 measures the time from when the trigger signal is transmitted to the vehicle side transmitter 12 to when the reception detection unit F2 detects the reception of the direct wave (hereinbelow, the direct-trip time). The direct-trip timer F3 measures an elapsed time from the transmission of the trigger signal by counting the clock signal input from the clock oscillator 115. The count value of the direct-trip timer F3 is returned to zero (that is, reset) every time the trigger signal is transmitted. Further, the count of the clock signal by the direct-trip timer F3 may be stopped at the timing when the reception detection unit F2 detects the reception of the direct wave.

The round-trip timer F4 measures the time from when the trigger signal is transmitted to the vehicle side transmitter 12 to when the reception detection unit F2 detects the reception of the response wave (that is, the round-trip time). The round-trip timer F4 measures an elapsed time from the transmission of the trigger signal by counting the clock signal input from the clock oscillator 115. The count value of the round-trip timer F4 is returned to zero (that is, reset) every time the trigger signal is transmitted. Further, the count of the clock signal by the round-trip timer F4 may be stopped at the timing when the reception detection unit F2 detects the reception of the response wave.

The position estimation unit F5 estimates the positional relationship between the vehicle and the mobile device on the basis of the direct-trip time acquired by the direct-trip timer F3 and the round-trip time acquired by the round-trip timer F4.

Specifically, the position estimation unit F5 subtracts the estimated value of the response processing time in the mobile device 2 from a value obtained by subtracting the direct-trip time from the round-trip time and also adds the time required for the impulse signal to propagate from the vehicle side transmitter 12 to the vehicle side receiver 13 (hereinbelow, the direct wave propagation time) to the value. The estimated value of the response processing time and the direct wave propagation time are registered in the ROM 113 as calculation parameters. The direct wave propagation time may be a value obtained by dividing the distance from the vehicle side transmitter 12 to the vehicle side receiver 13 by the propagation velocity C of a radio wave. Of course, a specific value of the direct wave propagation time may be previously specified by, for example, a test.

The time calculated in the above manner corresponds to the sum of the time required for the impulse signal to propagate from the vehicle side transmitter 12 to the mobile device 2 (hereinbelow, the outward flight time) and the time required for the impulse signal to propagate from the mobile device 2 to the vehicle side receiver 13 (hereinbelow, the return flight time), that is, the round-trip flight time. The reason why the time calculated by the above method corresponds to the round-trip flight time will be described with reference to FIG. 5.

Figure 5:
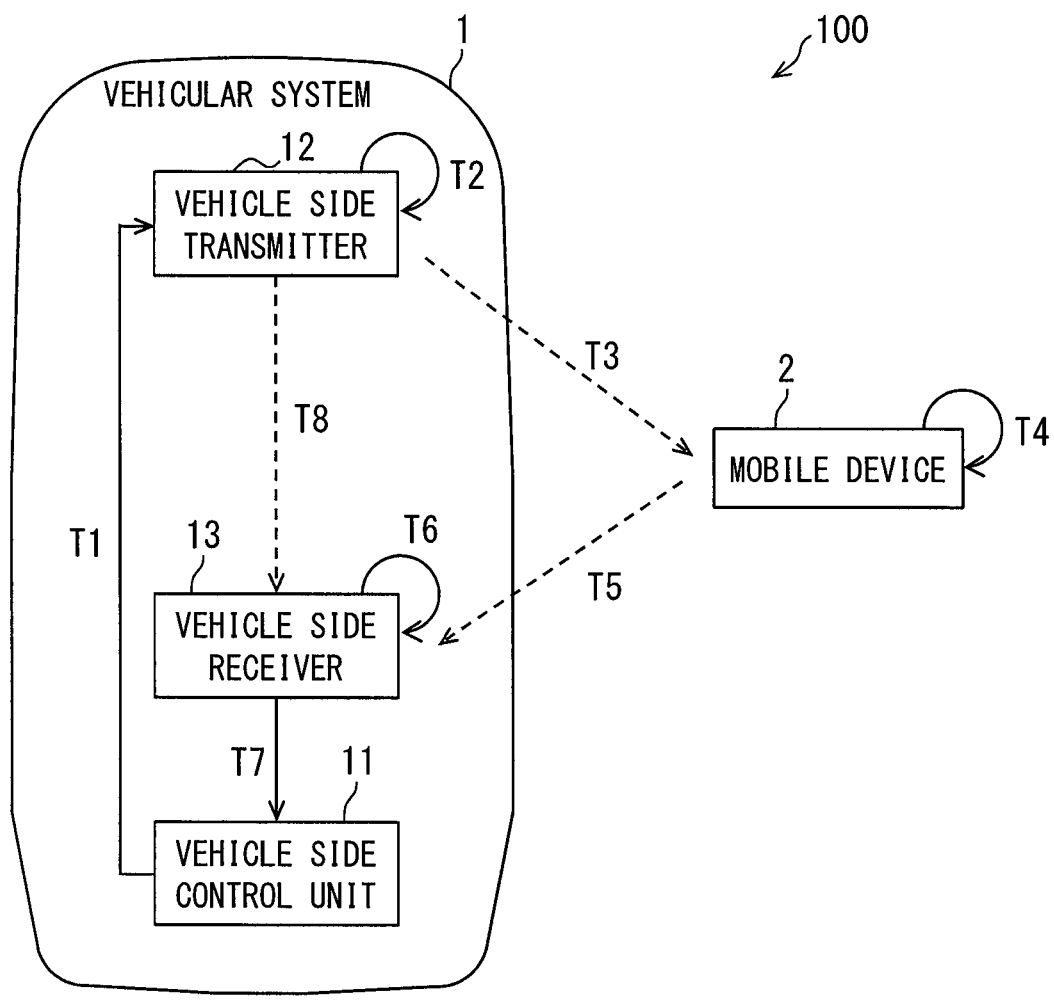
FIG. 5 is a diagram for describing the relationship between a round-trip time and a round-trip flight time.

FIG. 5 is a diagram conceptually illustrating various time components included in the round-trip time and the direct-trip time. In FIG. 5, T1 denotes the trigger transmission time, and T2 denotes the transmission processing time in the vehicle side transmitter 12. T3 denotes the outward flight time, and T4 denotes the response processing time in the mobile device 2. T5 denotes the return flight time, and T6 denotes the reception processing time in the vehicle side receiver 13. T7 denotes the received signal transmission time, and T8 denotes the direct wave propagation time.

The direct-trip time is a total value of the trigger transmission time, the transmission processing time, the direct wave propagation time, the reception processing time, and the received signal transmission time. Thus, when the direct-trip time is denoted by $T\alpha$, $T\alpha=T1+T2+T8+T6+T7$. On the other hand, the round-trip time is a total value of the trigger transmission time, the transmission processing time, the outward flight time, the response processing time, the return flight time, the reception processing time, and the received signal transmission time. Thus, when the round-trip time is denoted by $T\beta$, $T\beta=T1+T2+T3+T4+T5+T6+T7$.

Here, $T\beta-T\alpha=T3+T4+T5-T8$, and $T3+T5$ on the right side corresponds to the round-trip flight time. Further, $T3+T5$ corresponding to the round-trip flight time is represented by $T\beta-T\alpha-T4+T8$ by deforming the above equation. Thus, the round-trip flight time can be obtained by further subtracting the response processing time from a value obtained by subtracting the direct-trip time from the round-trip time and adding the direct wave propagation time to the value.

Next, the round-trip distance is calculated by multiplying the round-trip flight time obtained in the above manner by the propagation velocity C of a radio wave in the air. When the round-trip distance is equal to or less than a predetermined area forming distance (e.g., 7.5 m), it is determined that the mobile device 2 is present within the detection area. On the other hand, when the round-trip distance is larger than the area forming distance, it is determined that the mobile device 2 is not present within the detection area (in other words, around the vehicle).

<Operation of Vehicular System 1>

Next, a series of processes which is performed by the vehicular system 1 to detect an approach of the mobile device 2 to the vehicle (hereinbelow, the vehicle side process) will be described with reference to the flowchart illustrated in FIG. 6. The flowchart illustrated in FIG. 6 may be executed at a predetermined search period, for example, in a state in which the vehicle is parked. Power for the vehicular system 1 to execute the vehicle side process may be supplied from a vehicular battery (not illustrated).

First, the vehicle side control unit 11 outputs a trigger signal to the vehicle side transmitter 12 in step S101, and the process shifts to step S102. The vehicle side transmitter 12 transmits an impulse signal in the UWB band in step S102, and the process shifts to step S103. In step S103, the reception detection unit F2 detects reception of a direct wave in cooperation with the vehicle side receiver 13. When the reception of the direct wave has been detected, the process shifts to step S104. The direct-trip timer F3 specifies the direct-trip time Tα on the basis of a result of the detection of the reception detection unit F2 in step S104, and the process shifts to step S105.

In step S105, the reception detection unit F2 detects reception of a response wave in cooperation with the vehicle side receiver 13. When the reception of the response wave has been detected, the process shifts to step S106. The round-trip timer F4 specifies the round-trip time Tβ on the basis of a result of the detection of the reception detection unit F2 in step S106, and the process shifts to step S106. In step S106, the position estimation unit F5 calculates the round-trip distance on the basis of the direct-trip time Tα acquired in the above step S104, the round-trip time Tβ acquired in the above step S105, and the estimated value of the response processing time and the direct wave propagation time which are registered in the ROM 113. Then, the calculated round-trip distance is compared with the predetermined area forming distance to determine whether the mobile device 2 is present within the detection area (that is, the positional relationship).

Effects of Embodiment

In the above configuration, the detection area can be set to an elliptical shape by disposing the vehicle side transmitter 12 and the vehicle side receiver 13 away from each other in the vehicle front-rear direction and defining the detection area by the round-trip distance. That is, the detection area can be formed in an elliptical shape even with one transmitter and one receiver for the impulse signal.

Further, in the case where the area forming distance is 7.5 m, when the calculated round-trip distance is 6 m, it is possible not only to merely know that the mobile device 2 is present within the detection area, but also to specify that the mobile device 2 is present on an ellipse having a round-trip distance of 6 m.

Further, it is possible to distinguish whether the mobile device 2 is present inside the cabin or outside the cabin within the detection area on the basis of the calculated round-trip distance by defining that an area having a round-trip distance within a predetermined distance (e.g., 4.5 m) is inside the cabin. The distance defining the area inside the cabin (hereinbelow, the in-cabin defining distance) may be previously set, for example, in the ROM 113.

Further, according to the above configuration, the round-trip flight time component included in the round-trip time is extracted using the direct-trip time. According to such a configuration, it is possible to cancel variations in the trigger transmission time T1, the transmission processing time T2, the reception processing time T6, and the received signal transmission time T7 in the vehicular system 1. Thus, it is possible to specify a more accurate round-trip flight time. As a result, it is possible to calculate a more accurate round-trip distance.

Further effects of the present embodiment will be described using a comparative configuration. The comparative configuration described herein is a configuration in which a device (transceiver) for transmitting and receiving an impulse signal in the UWB band is disposed on the center of a vehicle. For convenience, the length from the front end to the rear end of a vehicle equipped with a vehicular system of the comparative configuration is 4.5 m in a manner similar to the above embodiment. Similarly, the length in the vehicle width direction is 2 m. The configuration in which the transceiver is disposed on the center Cnt of the vehicle corresponds to a configuration in which the vehicle side transmitter and the vehicle side receiver are collectively disposed at one position (specifically, the center of the vehicle).

Figure 7:
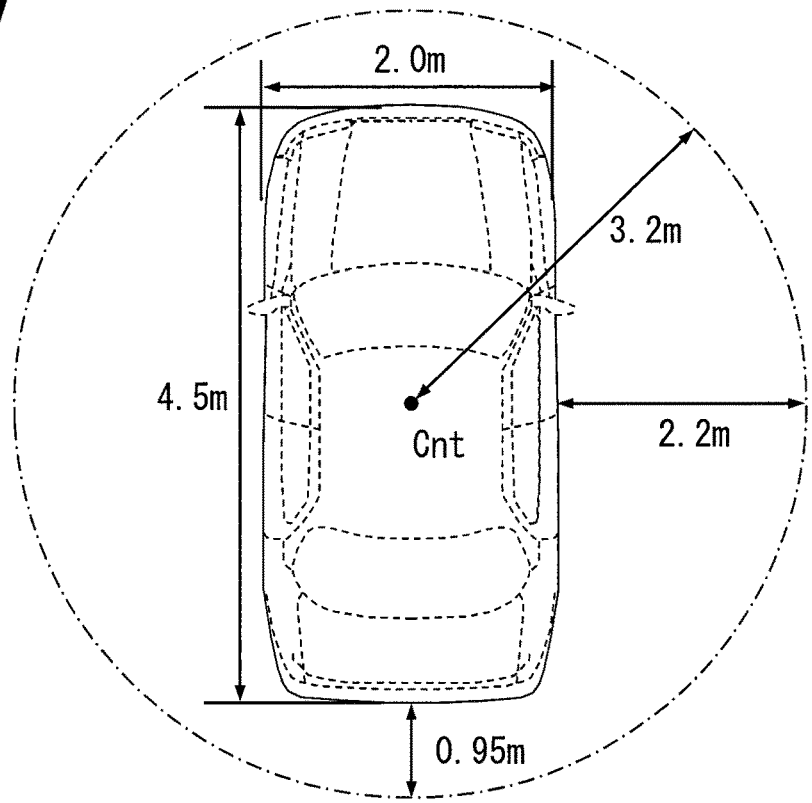
FIG. 7 is a diagram illustrating a detection area in a comparative configuration.

When the transceiver is disposed on the center of the vehicle like the comparative configuration, and the area forming distance is set so as to form a detection area of 2.2 m on the lateral side of the vehicle in a manner similar to the embodiment, the detection area is formed in a circular shape having a radius of 3.2 m as illustrated in FIG. 7. In FIG. 7, a dot-dash line indicates the outline of the detection area. In such a comparative configuration, it is possible to specify the distance from the transceiver to the mobile device by dividing the round-trip distance calculated on the basis of the round-trip time by two. However, since the vehicle has a body elongated in the front-rear direction, there is a large difference in the distance from the vehicle body outer edge to the mobile device 2 depending on the position where the mobile device 2 is present.

For example, even when the distance from the transceiver to the mobile device is specified as 3.2 m (that is, on a boundary line of the detection area), there is a large difference in the distance from the vehicle body outer edge to the mobile device 2 between when the mobile device 2 is present on the lateral side of the vehicle and when the mobile device 2 is present on the rear end side of the vehicle. Specifically, when the mobile device 2 is present on the lateral side of the vehicle, the distance from the vehicle body outer edge to the mobile device 2 is 2.2 m. On the other hand, when the mobile device 2 is present on the rear end side of the vehicle, the distance from the vehicle body outer edge to the mobile device 2 is only 0.95 m. The same applies to the case where the mobile device 2 is present on the front end side. That is, in the comparative configuration, the distance from the vehicle body outer edge to the boundary line of the detection area largely varies depending on the direction with respect to the vehicle.

Figure 8:
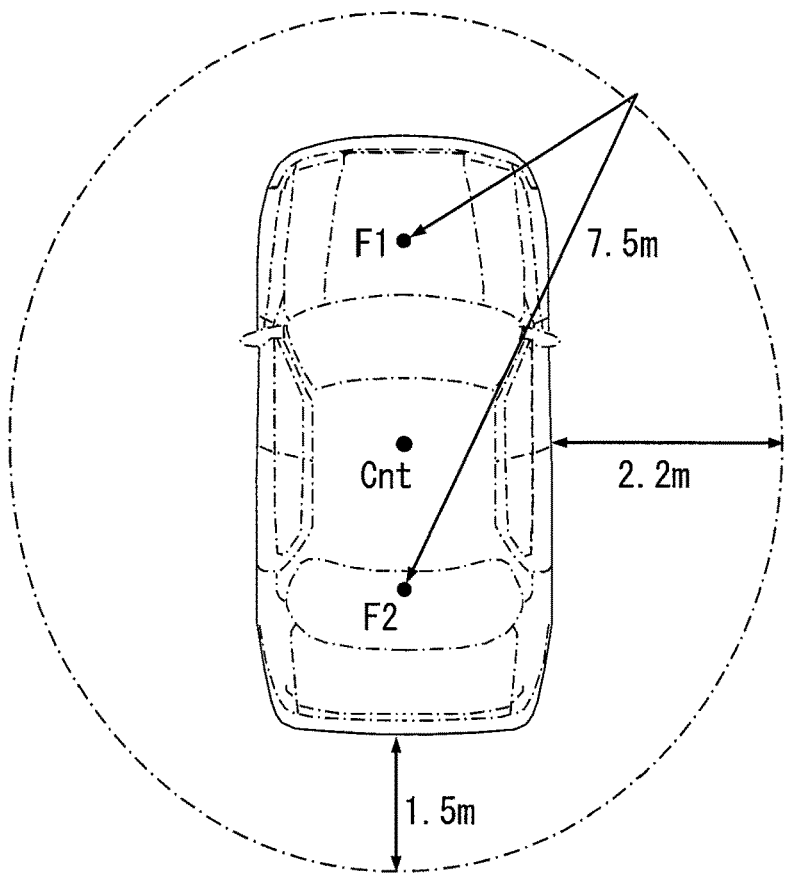
FIG. 8 is a diagram for describing effects of the present embodiment.

On the other hand, according to the configuration of the present embodiment, the detection area can be set to an elliptical shape whose major axis is aligned with the vehicle front-rear direction. Thus, it is possible to reduce nonuniformity in the distance from the boundary line of the detection area to the vehicle body outer edge between directions with respect to the vehicle. Specifically, as illustrated in FIG. 8, it is possible to set the distance from the vehicle rear end to the boundary of the detection area to 1.5 m while setting the distance from the vehicle side face to the boundary of the detection area to 2.2 m.

According to the configuration of the present embodiment, it is possible to reduce the nonuniformity in the distance from the boundary line of the detection area to the vehicle body outer edge. Thus, a rough distance from the outer edge of the vehicle body to the mobile device 2 can be recognized even with one vehicle side transmitter 12 and one vehicle side receiver 13.

An estimation result of the mobile device position estimation system 100 described above can be used in a smart entry system or an automatic parking system. In the smart entry system, it is preferred that the presence of the mobile device 2 can be detected also near a door for a trunk (hereinbelow, the trunk door) which is disposed on the rear end of the vehicle in addition to near a door for a user to enter the cabin. This is because, when the presence of the mobile device 2 can be detected also near the trunk door, it is possible to execute vehicle control for unlocking a lock mechanism of the trunk door on the basis of that a predetermined condition such as a user touching a handle of the trunk door is satisfied.

Further, in the automatic parking system, it is necessary to sense that the mobile device 2 is present around the vehicle. At this time, an area around the vehicle includes the front-rear direction which is the traveling direction of the vehicle. The detection area having an elliptical shape whose major axis is aligned with the vehicle front-rear direction, the detection area being provided by the above embodiment, responds to such a requirement. That is, the mobile device position estimation system 100 described above can be said to be suitable for means for detecting that the mobile device 2 is present around the vehicle in the smart entry system or the automatic parking system.

[First Modification]

Although the above embodiment discloses the configuration in which the vehicle side transmitter 12 and the vehicle side receiver 13 are disposed 4 m away from each other in the vehicle front-rear direction, the present disclosure is not limited thereto. The separation distance between the vehicle side transmitter 12 and the vehicle side receiver 13 only has to be set so as to form a desired detection area having an elliptical shape. When the semimajor axis of the detection area is denoted by a, and the semiminor axis thereof is denoted by b, the distance d between the vehicle side transmitter 12 and the vehicle side receiver 13 can be represented by the following equation. The installation positions of the vehicle side transmitter 12 and the vehicle side receiver 13 may be appropriately set on the basis of the semimajor axis and the semiminor axis of a detection area to be desirably formed and the following equation.

$$d = 2\sqrt{a^2 - b^2}$$ [Equation 1]

Note that the distance d between the vehicle side transmitter 12 and the vehicle side receiver 13 needs to be a value larger than a value ($\approx 0.3$ m) obtained by multiplying the rise time Tr of an impulse signal by the propagation velocity C of a radio wave. This is because of the following reason. As described above, an impulse signal in the UWB band is an abruptly rising signal, but there is the rise time Tr of approximately one nanosecond. The rise time Tr is reflected in the round-trip flight time. Thus, the round-trip flight time includes an error corresponding to the rise time Tr. That is, the round-trip distance calculated from the round-trip flight time includes an error derived from the rise time Tr.

If the distance d between the vehicle side transmitter 12 and the vehicle side receiver 13 is a value equal to or less than Tr×C, the detection area may become substantially identical to a circular detection area due to a distance-measurement error derived from the rise time Tr. That is, in order for the detection area to have an elliptical shape even with the distance-measurement error, it is necessary to satisfy the distance d>Tr×C.

[Second Modification]

Although the above embodiment discloses the configuration in which the direct-trip time is measured every time the impulse signal is transmitted, the present disclosure is not limited thereto. For example, the direct-trip time may be measured once at a predetermined timing such as the timing when an ignition power source is turned on, and a result of the measurement may be used in the calculation of the round-trip distance for a certain time.

Figure 6:
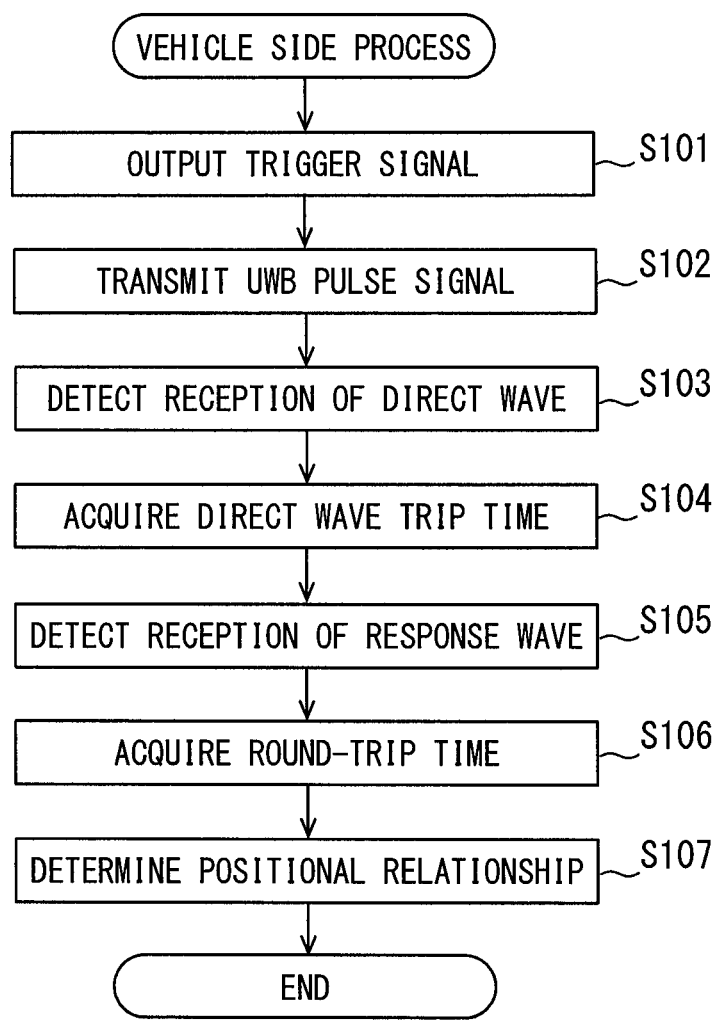
FIG. 6 is a flowchart for describing a process which is performed by a vehicular system to estimate the position of a mobile device 2.

Specifically, when steps S103 and S104 are performed once in the flowchart of FIG. 6 described above, a result of the measurement may be stored in the RAM 112 or the like, and steps S103 and S104 may be omitted from the next time. In other words, a process for specifying the time required to receive the direct wave (that is, the direct-trip time) and a process for specifying the time required to receive the response wave from the mobile device 2 (that is, the round-trip time) may be separately performed. According to such a configuration, it is possible to eliminate the necessity of measuring the direct-trip time every time the impulse signal is transmitted and reduce a calculation load in the CPU 111.

[Third Modification]

Although the above embodiment discloses the configuration in which the direct-trip time is measured, and the round-trip flight time and the round-trip distance are calculated using a result of the measurement, the present disclosure is not limited thereto. The total time of elements other than the round-trip flight time included in the round-trip time (hereinbelow, the non-flight time) may be registered in the ROM 113, and the round-trip flight time may be calculated by subtracting the non-flight time registered in the ROM 113 from the measured round-trip time.

Specifically, the non-flight time is the total time of the trigger transmission time T1, the transmission processing time T2, the response processing time T4, the reception processing time T6, and the received signal transmission time T7. The non-flight time may be previously specified by, for example, a simulation or a test, and stored in the ROM 113 as a calculation parameter.

[Fourth Modification]

The vehicular system 1 may have a function as a vehicular device used in a smart entry system. That is, the vehicular system 1 may have a function of performing an authentication process by wireless communication with the mobile device 2 and performing predetermined control such as unlocking of the vehicle door or engine start on the basis of the success of the authentication process. The authentication process described herein is a process for verifying that the mobile device 2 is a mobile device associated with the vehicular system 1 (that is, an authorized mobile device). The success of the authentication process by wireless communication corresponds to determining that the mobile device 2 is an authorized mobile device.

The vehicular system 1 in the fourth modification preferably executes the authentication process when the position estimation unit F5 determines that the mobile device 2 is present within the detection area. Executing the authentication process when it is determined that the mobile device 2 is present within the detection area corresponds to performing authentication of the mobile device on condition that the calculated round-trip distance is equal to or less than a predetermined threshold (here, the area forming distance).

The authentication process of the mobile device 2 may be performed by a known system such as a challenge-response system. Further, the wireless communication for the authentication process may also be performed by a known system. For example, the wireless communication for the authentication process may be performed using a radio wave in a low frequency (LF) band and a radio wave in an ultra high frequency (UHF) band. The LF band is, for example, a frequency band of 20 kHz to 200 kHz. The UHF band is, for example, a frequency band of 300 MHz to 3 GHz.

Further, the vehicular system 1 and the mobile device 2 may be capable of performing wireless communication of a so-called ultra wide band-impulse radio (UWB-IR) system using an impulse signal in the UWB band. Examples of a modulation system of the UWB-IR communication include an on-off keying (OOK) system which transmits information according to the presence/absence of an impulse signal. The vehicular system 1 and the mobile device 2 may perform the UWB communication using a known modulation system.

According to such a configuration, the vehicular system 1 and the mobile device 2 are capable of performing the authentication process of the mobile device 2 by transmitting and receiving an impulse signal in the UWB band. Accordingly, it is not necessary for the vehicular system 1 and the mobile device 2 to transmit and receive a signal in the LF band or the UHF band for the authentication process. Thus, the configuration in which the vehicular system 1 and the mobile device 2 transmit and receive a radio wave in the UHF band and the configuration in which the vehicular system 1 and the mobile device 2 transmit and receive a radio wave in the LF band can be omitted.

[Fifth Modification]

Figure 9:
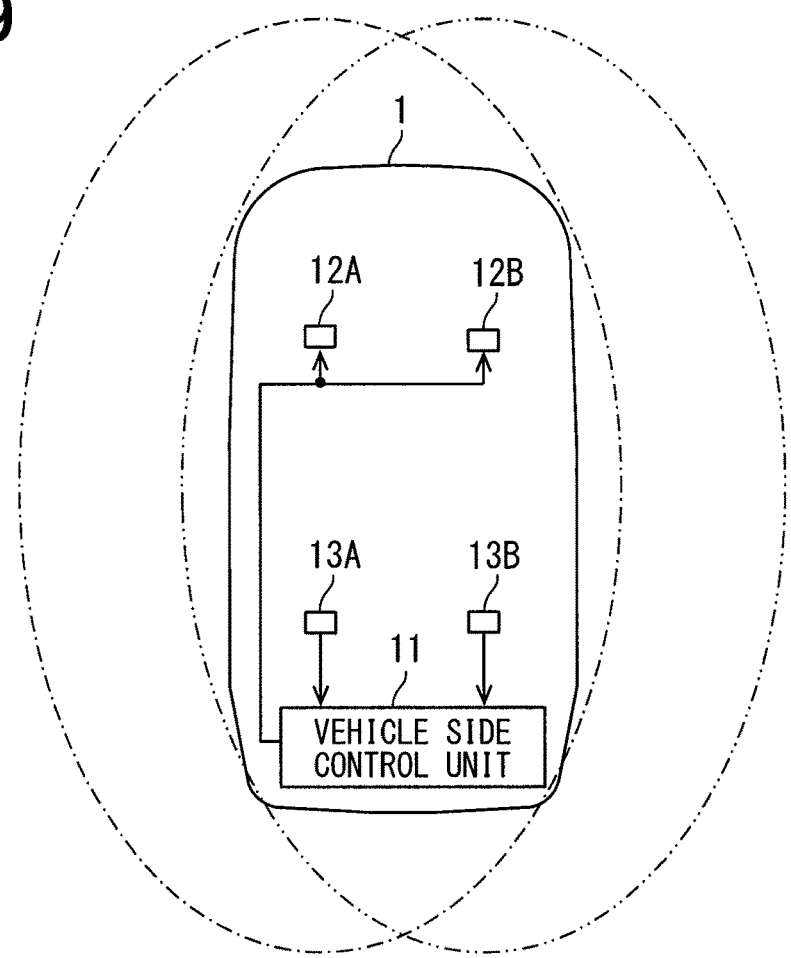
FIG. 9 is a diagram illustrating a modification of the vehicular system.

Although there is disclosed the configuration in which one vehicle side transmitter 12 and one vehicle side receiver 13 are mounted on the vehicle in the above, the present disclosure is not limited thereto. As illustrated in FIG. 9, two vehicle side transmitters 12 and two vehicle side receivers 13 may be provided. Vehicle side transmitters 12A, 12B illustrated in FIG. 9 correspond to the vehicle side transmitter 12. Further, vehicle side receivers 13A, 13B correspond to the vehicle side receiver 13.

A dot-dash line illustrated in FIG. 9 indicates the outline of a detection area formed by the combination of the vehicle side transmitter 12A and the vehicle side receiver 13A. A chain double-dashed line indicates the outline of a detection area formed by the combination of the vehicle side transmitter 12B and the vehicle side receiver 13B. A pair of one vehicle side transmitter 12 and one vehicle side receiver 13 which are disposed away from each other by a predetermined distance in the vehicle front-rear direction is defined as one set, and two sets are disposed side by side in the vehicle width direction. Accordingly, two detection areas each of which has an elliptical shape and has a longitudinal direction aligned with the vehicle front-rear direction can be formed side by side in the vehicle width direction. When, as illustrated in FIG. 9, the detection areas are set in such a manner that the detection areas overlap each other on the central part of the vehicle and do not overlap each other on the lateral side of the vehicle, it is possible to more precisely specify the position of the mobile device 2.

[Sixth Modification]

Figure 10:
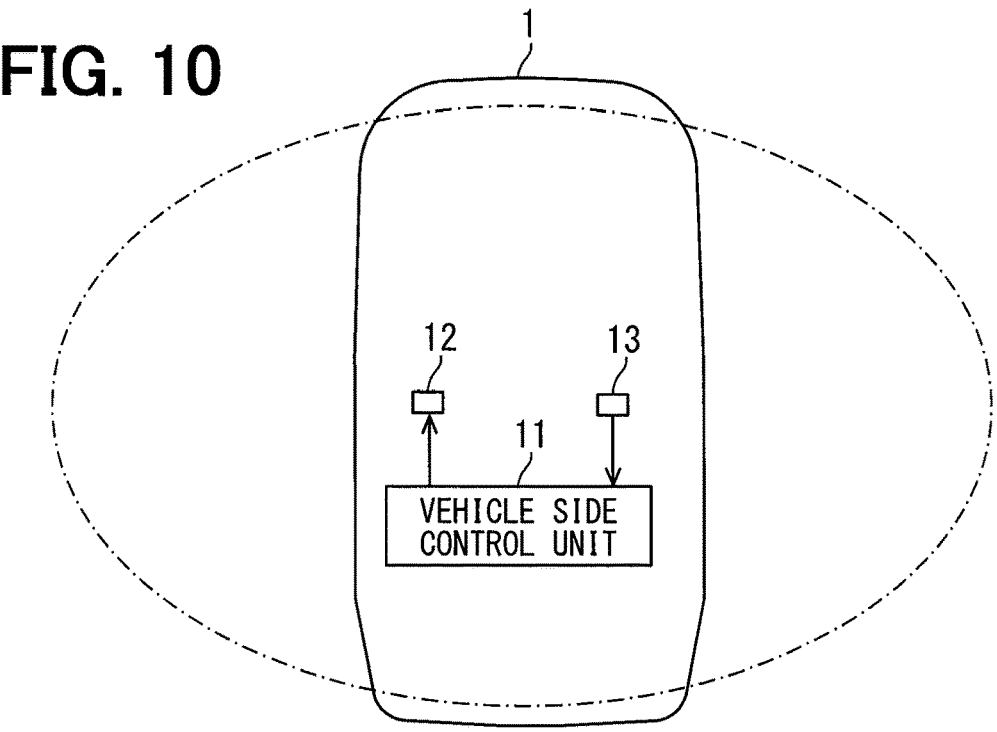
FIG. 10 is a diagram illustrating a modification of the installation positions of the vehicle side transmitter and the vehicle side receiver.

Although there is disclosed the configuration in which the vehicle side transmitter 12 and the vehicle side receiver 13 are disposed side by side in the vehicle front-rear direction in the above, the present disclosure is not limited thereto. As illustrated in FIG. 10, the vehicle side transmitter 12 and the vehicle side receiver 13 may be disposed side by side with a predetermined distance d therebetween in the vehicle width direction. According to such a configuration, as indicated by a dot-dash line of FIG. 10, it is possible to set a detection area which has an elliptical shape and has a longitudinal direction aligned with the vehicle width direction. As described above, the distance d may be appropriately set so as to form a desired detection area within the range larger than the value obtained by multiplying the rise time Tr of an impulse signal by the propagation velocity C of a radio wave.

[Seventh Modification]

Although the above embodiment discloses the configuration in which the communication between the vehicle side control unit 11 and the vehicle side transmitter 12 and the communication between the vehicle side control unit 11 and the vehicle side receiver 13 are performed using a signal having a lower frequency than the UWB band, the present disclosure is not limited thereto. The communication between the vehicle side control unit 11 and the vehicle side transmitter 12 and the communication between the vehicle side control unit 11 and the vehicle side receiver 13 may be performed using a signal in the UWB band.

It is noted that a flowchart or the processing of the flowchart in the present application includes sections (also referred to as steps), each of which is represented, for instance, as S11. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A mobile device position estimation system comprising:
a vehicular system mounted on a vehicle; and
a mobile device carried by a user of the vehicle, wherein:
the vehicular system includes:
a vehicle side transmitter that transmits an impulse signal which is a pulse-like signal having an ultra wide bandwidth when a predetermined transmission command signal is input;
a vehicle side receiver that receives the impulse signal and, when the vehicle side receiver receives the impulse signal, outputs a notification signal indicative of a reception of the impulse signal; and
a vehicle side control unit that is connected to each of the vehicle side transmitter and the vehicle side receiver, and outputs the transmission command signal to the vehicle side transmitter and receives the notification signal output from the vehicle side receiver;
the mobile device includes:
a mobile device side receiver that receives the impulse signal; and
a mobile device side transmitter that, when the mobile device side receiver receives the impulse signal, transmits the impulse signal as a response signal to a received impulse signal;

the vehicle side control unit includes:
  a reception detection unit that detects that the impulse signal as the response signal transmitted from the mobile device is received, based on an input of the notification signal, and that further detects that the vehicle side receiver directly receives the impulse signal transmitted by the vehicle side transmitter based on a time when the notification signal is input;
  a round-trip timer that measures, as a round-trip time, a time from when the transmission command signal is output to when the reception detection unit detects a reception of the impulse signal as the response signal; and
  a position estimation unit that estimates a position of the mobile device with respect to the vehicle based on the round-trip time measured by the round-trip timer;
  a direct-trip timer that measures, as a direct-trip time, a time from when the transmission command signal is output to when the reception detection unit detects that the vehicle side receiver directly receives the impulse signal transmitted from the vehicle side transmitter; and
  a storage unit that stores a calculation parameter for calculating the round-trip distance with the position estimation unit; and the storage unit stores, as he calculation parameter:
  a response processing time that is an estimated value of a time from when the mobile device receives the impulse signal transmitted from the vehicle side transmitter to when the mobile device transmits the impulse signal as the response signal; and
  a direct wave propagation time that is a time required for the impulse signal transmitted from the vehicle side transmitter to propagate directly to the vehicle side receiver;

the vehicle side receiver is disposed at a position spaced away from the vehicle side transmitter by a predetermined distance in a vehicle front-rear direction or a vehicle width direction; and the position estimation unit:
  calculates a round-trip distance that is a sum of a distance from the vehicle side transmitter to the mobile device and a distance from the mobile device to the vehicle side receiver, based on the round-trip time;
  determines whether the mobile device is present within a detection area having an elliptical shape, which has focuses at installation positions of the vehicle side transmitter and the vehicle side receiver, respectively, based on the round-trip distance;
  specifies a round-trip flight time by adding the direct wave propagation time stored in the storage unit to a difference between the round-trip time measured by the round-trip timer and the direct-trip time measured by the direct-trip timer, and subtracting the response processing time from an added value; and
  calculates the round-trip distance by multiplying the round-trip flight time and a propagation velocity of the impulse signal.

2. The mobile device position estimation system according to claim 1, wherein:
  the distance between the vehicle side transmitter and the vehicle side receiver is set to a value larger than a value obtained by multiplying a rise time required for raising the impulse signal and a propagation velocity of a radio wave in air.

3. The mobile device position estimation system according to claim 1, wherein:
  the vehicle side transmitter and the vehicle side receiver are disposed side by side with a predetermined distance therebetween on a center line of the vehicle.

4. The mobile device position estimation system according to claim 1, wherein:
  the vehicle side transmitter and the vehicle side receiver are disposed side by side with a predetermined distance therebetween in the vehicle width direction.

5. The mobile device position estimation system according to claim 1, wherein:
  the vehicular system performs a predetermined control with respect to the vehicle based on success of an authentication process by wireless communication between the vehicular system and the mobile device; and
  the vehicular system performs authentication of the mobile device when the round-trip distance measured by the position estimation unit is equal to or less than a predetermined threshold.

6. The mobile device position estimation system according to claim 5, wherein:
  the vehicular system and the mobile device performs UWB communication as wireless communication using the impulse signal; and
  the authentication process between the vehicular system and the mobile device is performed using the UWB communication.

* * * * *